Dec. 6, 1966  B. STEVERDING  3,289,459

METHOD OF MEASURING INTERFACIAL BONDING ENERGY

Filed May 19, 1964

Bernard Steverding,
INVENTOR.

Harry M. Saragovitz
BY Edward J. Kelly
Herbert Berl
James E. Staudt

United States Patent Office 3,289,459
Patented Dec. 6, 1966

3,289,459
METHOD OF MEASURING INTERFACIAL
BONDING ENERGY
Bernard Steverding, Huntsville, Ala., assignor to the United States of America as represented by the Secretary of the Army
Filed May 19, 1964, Ser. No. 368,722
2 Claims. (Cl. 73—15)

The invention described herein may be manufactured and used by or for the Government for governmental purposes without the payment of any royalty thereon.

This invention relates to a new method of determining the interfacial bonding energy between layers of various materials.

The determination of bonding energy between various materials has become increasingly important since more and more materials are sought to be bonded to one another in various types of scientific studies. This method is especially helpful in the field of missile design and production. The great possibilities of combining heterogeneous materials like metals and ceramics, organics and glasses, to new composite materials with predictable bonding characteristics depend to a large degree upon the bond in the interface between the materials. Since the interface is the region where mechanical and thermal stresses obtain their maximum values, these effects may often overshadow the physicochemical interface phenomena. Therefore a method was sought which would produce a measurement of the physicochemical bond independent of side effects like mechanical interlocking of rough surfaces.

Thus the primary object of my invention is to provide a method of determining the bonding energy between heterogeneous materials.

Another object of my invention is to provide an economical method of determining the bonding energy between heterogeneous materials.

Yet another object of my invention is to provide a method of determining the bonding energy between heterogeneous materials with a great deal of accuracy and dependability in the shortest possible time.

Figure 1:
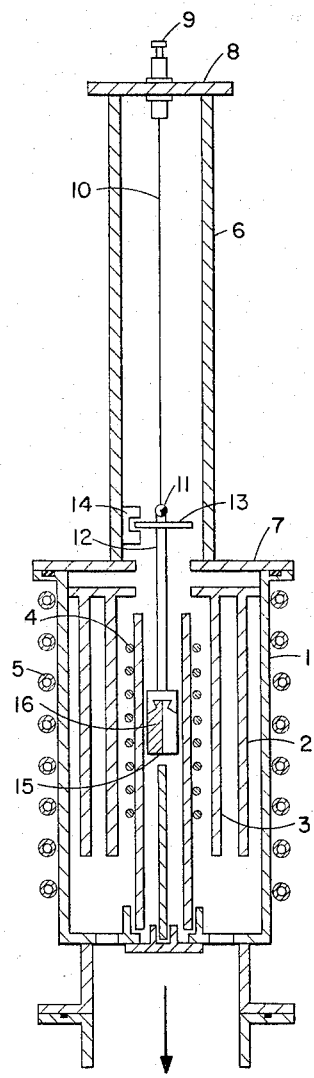
Figure 2:
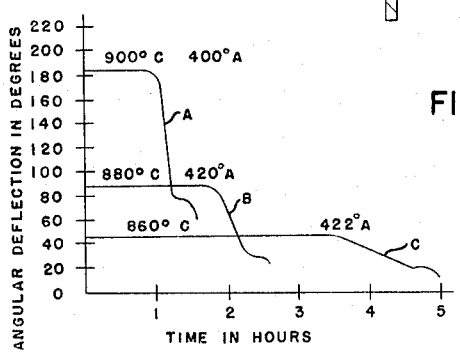

Other features of my invention will become apparent in due course from the following description hereof with reference to the accompanying drawings given primarily by way of example and in which:

FIGURE 1 is a sectional view of a vacuum tube furnace which is utilized in determining the vapor pressure of a test sample under controlled conditions; and, FIGURE 2 is a graphical representation of the isothermal evaporation of copper film material bonded on an aluminum substrate utilizing the apparatus and method according to the present invention.

Referring now to FIGURE 1, the evaporation apparatus consists of a main housing 1 which surrounds a series of radiation shields 2 and 3 which serve to reflect heat produced by heating coil 4. A coil 5 surrounds the exterior of housing 1 for controlling the temperature thereof by circulating liquid at a controlled temperature through the coil. A Pyrex cylinder 6 is mounted atop a body cover 7 and is closed at its upper end by a cylinder cap 8 thus forming in combination with the body an enclosed tube furnace. The joints of the furnace provide a sealed enclosure, thus permitting heating under a vacuum as indicated by the arrow in FIGURE 1. Vacuum readings of about $10^{-6}$ mm. Hg. are normally used. An insert 9 is mounted in cylinder cap 8 for reception of a thin tungsten wire 10. To provide for optical measuring of the rotation of wire 10 a mirror 11 is attached to the bottom end of the wire. A magnesium disk 13 is provided at the upper end of sample holder 12 and is positioned adjacent a horseshoe magnet 14 which cooperates with the disk to form a magnetic damping means for elimination of excessive rotation or gyration of the sample holder. Disk 13 is provided with radial indicia for indicating its rotational position. A sample substrate 15 is attached to the lower end of sample holder 12. This substrate may be of any desired material which is relatively free from pores which may adversely affect the results of a bonding energy test. A thin film is applied to ½ of the lateral surface of the substrate on opposite faces thereof.

The novel method used in this investigation is based upon the following principle. Layers of film material bonded to a substrate are continuously removed by evaporation of molecules until the vicinity of the interface between the bonded material and the substrate is reached. The energy required to remove these layers at various distances from the interface differs. This total energy change corresponds to the interfacial binding energy between the film material and the substrate. The layer removal is achieved by evaporation of molecules under isothermal conditions. For example, the outermost layer of a metal film of high purity and of sufficient thickness evaporates under isothermal conditions at a first constant measurable rate. The vapor pressure value during this first period is known as the bulk vapor pressure, $P_0$, of the bonded material. But as the film becomes thinner in the course of further evaporation the free surface of the metal film finally enters the vicinity of the interface and the evaporation rate will decrease as a function of the existing binding force. The time period during which this decrease is evidenced may be referred to as a transition period, the decrease indicating that the interfacial binding forces are effective. At the end of this transition period, the vapor pressure again becomes constant, thus, indicating that a monolayer of bonded material remains on the substrate. For universal application of this method the vapor pressures of the film and substrate must be of a different order of magnitude.

In operation of the device the temperature of the vacuum furnace is brought at least to the minimum temperature at which the film will evaporate at a rate, measurable by the apparatus. The vapor pressure of the film on opposite faces and lateral portions of the substrate will cause a torsional force to be applied to the sample holder. The sample holder will rotate an amount proportional to the vapor pressure of the films. The force may be measured by optical means in conjunction with the use of mirror 11 or by direct readings utilizing the indicia on disk 13. To calculate the exact vapor pressure from the angular deflection of the sample holder the spring constant of the wire 10 must be considered in the calculations.

The method of determining the bonding energy between a film and its substrate is of course not limited to the illustrated apparatus which is only one of several ways which vapor pressure rates of a material bonded to a substrate can be determined.

Restated briefly and without regard to apparatus, the method contemplates coating a substrate with a thin film of material having a vapor pressure which is higher than that of the substrate, and heating the sample to the point at which the film will be vaporized. When the desired vaporization temperature is reached the vapor pressure of the film will be a constant value until in the course of further evaporation the film becomes so thin that the interfacial bonding between the materials will influence the rate of evaporation. At this point there is a decrease in the evaporation rate of the film material and consequently in the vapor pressure. Thus, a transition zone is defined during the period that the pressure is decreasing. At the end of this transition zone the vapor pressure will again becomes a constant value, thus, indicating the adherence of a monolayer of film material remaining on the substrate. If the test is continued, the vapor pressure will again decrease at the end of the second constant rate period, thus indicating that gaps are occurring in the monolayer wherein substantially all traces of the film have been evaporated. It is apparent that a temperature which is sufficient to begin evaporation of the interfacial vicinity but insufficient to completely evaporate the film will provide incremental data which may also be used to compute bonding energy. Such a temperature would result in a leveling off period in so far as the evaporation rate is concerned.

This method of determining the bonding energy between layers of materials may be further clarified by way of a complete test example wherein the substrate material will be alumina and the film material will be copper. Reference is made to FIGURE 2 which illustrates graphically the results of this test, wherein the angular deflection in degrees is plotted against time. Curves A, B and C are shown to illustrate the effect at different temperatures, curve A representing the present example.

Using a copper test sample having a thickness of 2,000 angstroms over a substrate of alumina the copper film, when heated, will evaporate with a constant vapor pressure to a thickness of about 410 angstroms at a temperature of about 901° C. The threshold of the interface is observed by noting and recording the time or point at which the vapor pressure of the film decreases. In this example, at approximately one hour, the pressure decrease is noted. The vapor pressure is then continuously recorded from this point until the pressure again becomes constant, and may be recorded until the pressure again decreases, thereby indicating that gaps are occurring in the monolayer.

In order to obtain a value for the bonding strength from the experimental data the vapor pressure is related to the angular deflection $\theta$ by the following formula:

$$p = 4D\theta/a^2 l$$

where $D$ is the torsional spring constant, $a$ the width of the film, and $l$ the length of the film.

The free energy of binding, $\Delta F$, may be expressed by the ratio of the vapor pressure of the bulk metal and the vapor pressure of the metal subjected to the interfacial bonding forces $$\Delta F = -RT \log P/P_0 = -RT \log \theta/\theta_0$$

where $P_0$ is the bulk vapor pressure, $P$ the vapor pressure of the monolayer of material under the influence of the bond, $\theta_0$ is the deflection caused by vaporization of the outer surface vicinity of the film, $\theta$ is the deflection occurring when the film surface becomes evaporated to the vicinity influenced by the bond, i.e., the monolayer T is the temperature and R the gas constant.

The copper sample yielded an angular deflection $\theta_0$ of 186 until the film evaporation progressed to the vicinity of the interface where the bonding influence caused a drop to deflection $\theta$ which value was 81.

Calculating the energy change which occurred in the copper film resulted in an energy change $\Delta F$ of 1980 calories. Assuming the exact bonding energy is not desired but rather a comparison made between various materials the mathematical derivations need not be completed but rather a comparison made of the data obtained by this method. It will be apparent from a comparison of evaporation curves A, B and C (FIG. 2) that when comparing test samples, the sample which requires a higher temperature or a longer period of time to evaporate the interfacial vicinity would have the greater bonding energy.

This method is effective for determining the bonding energy between most known materials or combinations of materials such as ceramics, organics and glasses as well as metals.

While the foregoing is a description of the preferred embodiment the following claims are intended to include those variations and modifications that are within the spirit and scope of the invention.

I claim:
1. A method of determining the interfacial bonding energy of a material bonded to a substrate material, the method comprising:

heating said material to a predetermined temperature at which evaporation of said bonded material occurs at a first constant measurable rate during a first time period, the vapor pressure during this period being defined as the bulk vapor pressure, $P_0$, of said bonded material;

recording the value of $P_0$;

maintaining isothermal conditions while there is a transition period wherein the vapor pressure decreases indicating the interfacial binding forces are effective and maintaining said isothermal conditions until the vapor pressure of the bonded material again becomes constant thereby indicating that only a monolayer of bonded material remains on the substrate, the latter vapor pressure being defined as the vapor pressure of the monolayer, $P$, of the bonded material remaining on the substrate; and, recording the value of $P$, wherein, by utilizing the resulting measurements, $P$ and $P_0$, an indication of the interfacial bonding energy is obtained.

2. The method defined in claim 1 wherein the interfacial bonding energy between the bonded material is mathematically calculated by using said pressure values, $P$ and $P_0$, in the formula $$\Delta F = -RT \log P/P_0$$

where R is the gas constant, and T is the temperature.

References Cited by the Examiner
UNITED STATES PATENTS
3,028,747   4/1962   Verderame et al. _____ 73—15

RICHARD C. QUEISSER, *Primary Examiner.*

JACK C. GOLDSTEIN, *Assistant Examiner.*